United States Patent [19]

Ferguson

[11] Patent Number: 4,509,000
[45] Date of Patent: Apr. 2, 1985

[54] BUMPLESS FEEDBACK SWITCHING APPARATUS FOR USE IN A SERVO SYSTEM

[75] Inventor: Hugo S. Ferguson, Averill Park, N.Y.

[73] Assignee: Duffers Scientific, Inc., Troy, N.Y.

[21] Appl. No.: 480,800

[22] Filed: Mar. 31, 1983

[51] Int. Cl.³ ............................................. G05B 7/00
[52] U.S. Cl. .................................. 318/591; 318/561; 318/610; 364/181
[58] Field of Search ............... 318/591, 609, 610, 561; 364/160, 161, 162, 163, 181

[56] References Cited

U.S. PATENT DOCUMENTS

| | | | |
|---|---|---|---|
| 3,694,633 | 9/1972 | Lejon | 318/591 X |
| 3,742,324 | 6/1973 | Gross et al. | 318/591 |
| 3,935,523 | 1/1976 | Cleveland et al. | 318/610 X |
| 3,940,593 | 2/1976 | Bleak et al. | 318/591 X |
| 3,940,594 | 2/1976 | Bleak et al. | 318/591 X |
| 3,942,088 | 3/1976 | Yosioka et al. | 318/591 |
| 4,141,065 | 2/1979 | Sumi et al. | 318/591 X |
| 4,466,054 | 8/1984 | Shigemasa et al. | 318/561 X |

Primary Examiner—B. Dobeck
Attorney, Agent, or Firm—Pennie & Edmonds

[57] ABSTRACT

Apparatus, for use in a servo-control system and which provides a smooth "bumpless" transition while switching from one transducer feedback signal to another, is described. Specifically, with this apparatus, a plurality of tracking signals are first produced in which each signal has a value which, in response to the value of a corresponding select signal, either tracks the feedback signal produced by a corresponding one of a plurality of transducers or remains constant. Each of these tracking signals is then subtractively summed with the feedback signal produced by the corresponding transducer in order to produce an output signal. Each of the output signals is then fed-back and subtractively summed with a command signal and the resulting difference, in turn, is applied as an error signal to a servo-amplifier. The values of all the select signals are set, by illustratively a process computer, in accordance with the particular transducers being switched. Since values of all the feedback output signals are equal to zero, at the instant any transducer is switched, a "bumpless" transition advantageously results regardless of which transducer is switched, when it is switched and any difference occurring between the values of the feedback signals of the transducers being switched.

8 Claims, 2 Drawing Figures

BUMPLESS FEEDBACK SWITCHING APPARATUS FOR USE IN A SERVO SYSTEM

BACKGROUND OF THE INVENTION

1. Field of the Invention

The invention relates to servo-control systems which, more particularly, effectuate a smooth bumpless transition while switching from one transducer feedback signal to another.

2. Background of the Invention

During the last decade, extensive use has been made of servo-mechanisms in order to provide accurate control over some form of mechanical motion. These servo-mechanisms are typically comprised of a servo-control system, an actuator, and a feedback transducer. The actuator, typically electric, hydraulic or pneumatic, provides the desired motion, e.g., rotation or displacement, to drive a mechanical system. This motion is measured by the transducer, which generates a signal that is usually proportional to the value of the variable being measured. The signal provided by the transducer is fed back as an input to the servo-control system. Within the servo-control system, the feedback signal is subtracted from a command, or program, signal. A resulting difference signal is applied to a servo-amplifier which, in turn, drives the actuator. By virtue of the negative feedback inherent in this system, the actuator is driven such that the value of the transducer feedback signal will tend to equal the command signal thereby producing a zero-valued difference, or error, signal.

Oftentimes in such servo-mechanisms, the actuator or prime mover is an hydraulic cylinder, which is controlled by a very fast, sensitive hydraulic valve. The motion produced by the cylinder is usually characterized by a number of different variables, such as stroke, i.e., displacement of the cylinder from a known position, and—from the perspective of the object upon which the cylinder acts—longitudinal strain, cross-wise strain, force and stress. A signal proportional to each variable is simultaneously produced by a separate corresponding transducer and is available as a separate feedback signal. Typically, however, at any one time, the servo-mechanism is controlled by only one of the transducer feedback signals.

While the servo-mechanism is operating, it is often useful to switch between different transducer feedback signals, in order to change the type, or mode, of control from, for example, stroke control to true stress control. This requires switching between different feedback signals, i.e. the current and the desired feedback signals, which are produced by two different transducers. Since, at any instant, each and every transducer usually produces a signal having a value that is different from that produced by any other transducer, a difference exists between the current and desired feedback signals produced by the current and desired transducers, respectively. Consequently, at the instant a switchover between transducers is effectuated, the difference is imparted to the error signal. Consequently, this difference is applied to the servo-amplifier and thus causes a sudden "bump" or shift in the movement produced by the actuator. If this difference is sufficiently large, then the resulting large movement may disadvantageously damage or destroy the mechanical system being controlled.

Various attempts have been made in the art to provide smooth "bumpless" switching between a plurality of different feedback signals. However, these attempts, typified by that disclosed in U.S. Pat. No. 3,742,324 (issued to A. E. Gross et al on June 26, 1973), possess several drawbacks. Specifically, this patent discloses the concept of using a track and hold device to temporarily store the value that the error signal has immediately prior to a switchover. This stored error signal value is used to establish open loop control of the servo-mechanism during the switchover. Simultaneously therewith, the servo-control system monitors the feedback signal produced by the desired transducer and adjusts the command signal, by slewing it to a new value, such that the new value of the command signal less the signal produced by the desired transducer equals the value of the error signal stored in the track and hold device. At the instant equality occurs, the track and hold device is placed in the "track" mode thereby placing the desired transducer as the feedback element in a closed control loop. While this approach does produce a "bumpless" transition, it requires that the servo-control system both monitor the signal produced by the desired transducer and slew the command signal accordingly. Consequently, this requirement significantly increases the complexity of the circuitry of the servo-controller. Also this requirement disadvantageously injects a delay into the response of the servo-control system, which, in turn, lowers the overall response of the entire servo-mechanism.

SUMMARY OF THE INVENTION

Accordingly, it is an object of the present invention to provide a circuit for use in a servo-controller which can switch between any number of different transducer feedback signals and simultaneously produce a "bumpless" transition in the motion produced by an actuator.

Another object is to provide such a circuit which produces a "bumpless" transition in a minimum amount of time and without lowering the overall response of the servo-mechanism.

An additional object is to provide such a circuit which provides a "bumpless" transition in a much shorter period of time than the response time of the controlled mechanical system.

Another additional object is to provide such a circuit which does not require complex circuitry and/or complex software.

A further additional object is to provide such a circuit which maintains closed loop control at all times while substantially eliminating switching transients.

Yet a further additional object is to provide such a circuit which can easily be expanded to accommodate any number of additional transducer feedback signals without requiring additional complex circuitry and/or complex software.

These and other objects are achieved in accordance with the present invention by first producing a plurality of tracking signals, each of which has a value which either tracks the feedback signal produced by a corresponding one of the transducers or remains constant, and second subtractively summing each of these tracking signals with the feedback signal produced by the corresponding transducer in order to produce an output signal. All these output signals are fed-back and subtractively summed with the command signal and the resulting difference, in turn, is applied as the error signal to the servo-amplifier. With this arrangement, the values of all the fed-back output signals are advantageously equal to a constant, preferably zero, at the instant any of the transducers are switched. This thus insures that a "bumpless" transition, in the motion produced by the actuator, occurs whenever any transducer feedback signals are switched.

Specifically, in the preferred embodiment disclosed herein, a separate track and hold device is used to track the feedback signal produced by each transducer. The tracking is controlled by a signal, hereinafter referred to as a select signal, which depending upon its value causes the voltage produced by the track and hold device to either track the transducer feedback signal or remain constant. In order to switch to a particular transducer, the select signal applied to the track and hold device associated with that transducer is set to the value which places that track and hold device in the "hold" mode. Thus, the voltage produced by the track and hold device remains constant and the fed-back output signal associated with the desired transducer equals the feedback signal, produced by this transducer, biased by a constant. The select signals applied to all the other track and hold devices are set to place all those devices in the "track" mode. Consequently, each fed-back output signal associated with each of these unselected transducers remains at zero.

In order to "bumplessly" switch between different transducer feedback signals, the value of the command signal is first reduced to zero. As soon as this occurs, the appropriate select signal is set to the "hold" value and from that point onward control of the servo-mechanism occurs with the selected transducer as the feedback device. As soon as the desired transducer is selected, the command signal is changed to a new value corresponding to the desired motion as measured by the selected transducer. Advantageously, with this arrangement, since all the fed-back output signals are always substantially equal at the instant any transducer is selected, a "bumpless" transition always occurs regardless of which transducer is selected, when it is selected, and any difference occurring between the values of the feedback signals of the transducers being switched.

In addition, use of the present invention advantageously simplifies the external process computer and/or any control circuitry, which generates the command signal. Specifically, since all the fed-back output signals are zero-valued at the instant any transducer is selected, a zero-valued reference point is established for every transducer, at the instant switchover occurs, regardless of what the actual value of any feedback signal happens to be at that time. Thus, the process computer is only required to produce an incremental command signal referenced to "zero" rather than to the value of the actual feedback signal produced by the desired transducer at the instant it is selected. This thus eliminates the need for the computer to track the feedback signals produced by any or all of the transducers. Consequently, this advantageously simplifies the circuitry and/or its associated software required to generate the command signal, and also ensures that the overall response time of the servo-mechanism is advantageously unaffected by any switchover.

In accordance with a feature of this invention, any remaining minor irregularities--which in practice occur in the motion produced by the actuator at the instant any transducer is selected--are advantageously removed by a digitally enabled low pass filter which filters the error signal that is applied to the servo-amplifier. Specifically, during the short interval of time required to switch between different transducer feedback signals, the process computer enables the filter, which, in turn, smoothes the error signal applied to the servo-amplifier. This, in turn, advantageously removes any irregularities in the resulting motion.

DESCRIPTION OF THE DRAWING

The invention may be clearly understood from a consideration of the following detailed description and accompanying drawing in which.

To facilitate easy understanding, identical reference numerals are used to denote identical elements common to both figures.

DETAILED DESCRIPTION

Although the teachings of the present invention are applicable to any type of negative feedback servo-mechanism, for purposes of description, the present invention will be described in the context of a negative feedback hydraulic servo-mechanism.

Figure 1:
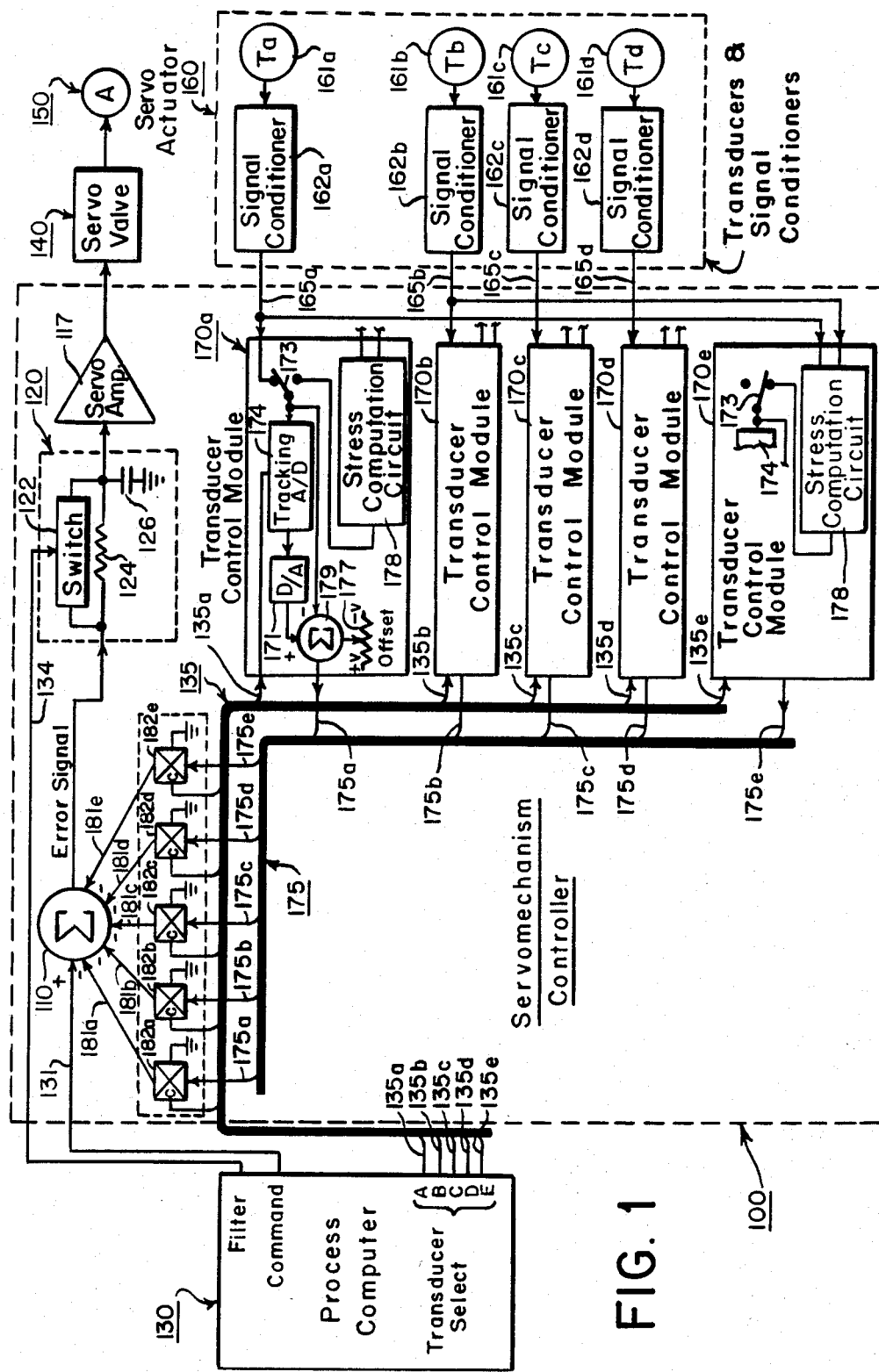
FIG. 1 is a block diagram of the circuitry of an electronic servo-controller embodying the principles of the present invention.

Specifically, the hydraulic servo-mechanism shown in FIG. 1 is comprised of process computer 130, servo-controller 100, servo-valve 140, actuator 150 and transducers and signal conditioners 160. The function of this servo-mechanism is to apply a suitable force to a specimen under test (not shown) in order to induce strain in the specimen. Actuator 150 is illustratively a hydraulically operated piston which acts against the specimen. Suitable transducers well known to the art are provided to measure: the force imparted to the specimen, any lengthwise strain produced along a major axis of the specimen, any crosswise strain produced across a midspan of the specimen, and the stroke of the cylinder. These transducers are labelled 161a, 161b, 161c and 161d, respectively. Transducer 161a (henceforth referred to as the force transducer) is preferably a suitable load cell, such as model number FFL18/±12U-3SG produced by the Strainsert Corporation. Transducers 161b and 161c (henceforth referred to as the lengthwise and cross-wise strain transducers) are each comprised of one or more linear variable differential transformers (LVDT), illustratively model number 250MHR produced by the Schaevitz Corporation, which are secured to the specimen via well-known mounting fixtures. Lastly, transducer 161d (henceforth referred to as the stroke transducer) is a position sensor mounted to the cylinder and is also a LVDT, typified by model number 2000 DC-D also produced by the Schaevitz Corporation.

As shown in FIG. 1, process computer 130 generates an analog command signal which is applied, via lead 131, as one input to summer 110. Alternatively, if the waveform of the command signal is simple, the command signal may be synthesized by a suitable function generator. Within summer 110, the command signal is subtractively combined with a plurality of fed-back output signals—to be discussed in detail shortly—appearing on leads 175, specifically leads 175a, 175b, 175c, 175d and 175e, and routed through switch 182 and leads 181a through 181e, respectively, to produce an error signal. The error signal is indicative of any deviation occurring in the motion produced by the actuator, as measured by a selected one of the transducers, and the simultaneously occurring value of the command signal. The error signal is first applied to the input of low pass filter 120, and is thereafter applied to servo-amplifier 117 which, in turn, drives hydraulic servo-valve 140. Servo-amplifier 117 generates the properly scaled voltage level needed to control the hydraulic servo-valve and also buffers the signal applied to this valve from the remaining electronics in the servo-controller. Servo-valve 140 regulates the amount of hydraulic fluid applied, from a suitable well-known hydraulic pump (not shown), to actuator 150 in order to produce the desired displacement of the hydraulic piston.

The motion of the piston and the reaction of the specimen is measured, as previously discussed, by transducers 161a, 161b, 161c and 161d. Each of these transducers produces a signal (hereinafter referred to as a transducer feedback signal) proportional to the quantity being measured. Each transducer feedback signal is applied to a corresponding one of transducer signal conditioners 162a, 162b, 162c or 162d. The signal conditioners amplify and properly scale each of the transducer feedback signals to the same maximum span, illustratively ±10 volts.

The scaled transducer feedback signal produced by each signal conditioner is applied as an input to at least one of transducer control modules 170a, 170b, 170c, 170d or 170e. Each of these modules provides "bumpless" switching involving its associated transducer. The output signal produced by each transducer control module is fed-back, via a corresponding one of feedback leads 175 (namely, leads 175a, 175b, 175c, 175d or 175e), switch 182 and a corresponding one of leads 181a through 181e, respectively, to an input of summer 110. Within this summer, each fed-back output signal is subtractively summed with the command signal.

Since transducer control modules 170a, 170b, 170c and 170d all contain identical circuitry and are all similarly connected, for the sake of brevity, only transducer control module 170a will now be discussed. As shown in FIG. 1, the transducer feedback signal generated by force transducer 161a and conditioned by signal conditioner 162a (hereinafter referred to as the scaled force transducer feedback signal) is applied over lead 165a to transducer control module 170a. Within this module, the signal is routed to one input of switch 173. The other input is fed by the output of stress computation circuit 178, which is discussed in detail hereinbelow. With the armature of switch 173 positioned as shown, the scaled force transducer feedback signal is applied through the switch to the input of a track and hold amplifier. This amplifier is illustratively comprised of tracking analog-to-digital (A/D) converter 174 and digital-to-analog (D/A) converter 171. The A/D converter operates in two modes, i.e., "track" or "hold", depending upon the value of a control signal, hereinafter referred to as a select signal, applied to the converter. In the "track" mode, this converter produces a digital output, which is substantially the digital equivalent—usually in offset binary—of the analog value of the scaled force transducer feedback signal. Alternatively, whenever the A/D converter is placed in the "hold" mode, its output remains constant at, more specifically, the value of the scaled force transducer feedback signal at the instant the mode of the converter was most recently changed from "track" to "hold". The digital output of A/D converter 174 is applied as input to D/A converter 171. The analog signal, produced by the D/A converter is applied to one input of summer 179. This summer subtractively combines this signal with the scaled force transducer feedback signal which is applied to a second input to summer 179, and with a d.c. potential generated by offset potentiometer 177 and applied to a third input to summer 179. The resulting output signal (hereinafter referred to as the fed-back output signal) produced by summer 179 is fed-back over lead 175a to an input of a corresponding switching device 182a, contained within switch 182. The output signal produced by this switching device is applied via lead 181a, to a corresponding input to summer 110.

The value of the fed-back output signal is governed by the mode of the tracking A/D converter. In particular, the value of this signal is substantially zero whenever tracking A/D converter 174 is operating in the "track" mode. Any offset from zero remaining in this signal can be advantageously cancelled by appropriately positioning the armature of offset potentiometer 177. Alternatively, whenever the tracking A/D converter is operating in the "hold" mode, the value of the fed-back output signal substantially equals the scaled force transducer feedback signal less a constant. The constant equals the value of the scaled force transducer feedback signal at the instant the mode of the A/D converter is changed from the "track" to "hold". As will shortly become evident, bumpless switching is produced because at the moment of any switchover, all the values of all the fed-back output signals are zero regardless of what the actual value of each transducer feedback signal happens to be.

From the foregoing discussion, it is readily apparent that the value of the fed-back output signal produced by transducer control module 170a should be zero whenever A/D converter 174 is operating in the "track" mode. However, in practice, various circuit conditions such as noise, thermal drift, aging, and offset together cause the value of the fed-back output signal to vary from zero. Since only the offset portion can be effectively cancelled by the d.c. potential produced by offset potentiometer 177 and applied to an input of summer 179, switching device 182a ensures that the output signal applied, over lead 181a as an input to summer 110, is truly zero-valued whenever A/D converter 174 is operating in the "track" mode. Specifically, whenever the select signal places A/D converter 174 in the "track" mode, switching device 182a, in response to the same select signal applied to it, applies ground potential to lead 181a. This ensures that the signal applied to the corresponding input to summer 110 is indeed zero-valued. Alternatively, whenever the select signal causes A/D converter 174 to operate in the "hold" mode, switching device 182a merely passes the fed-back output signal appearing on lead 175a to lead 181a and from there to corresponding input of summer 110. The other switching devices 182b, 182c, 182d and 182e, which also comprise switch 182, perform an identical function.

The operation of applicant's apparatus to produce a "bumpless" switch will now be described. While applicant's circuitry described hereinabove can produce a "bumpless" switch between the feedback signals generated by any pair of the transducers shown in FIG. 1, the circuitry operates in the same fashion regardless of which pair is selected. Therefore, the following example involving the lengthwise strain and force transducers, is merely illustrative.

Assume that servo-controller 100 has been controlling the motion produced by actuator 150 using the feedback signal produced by lengthwise strain transducer 161b and it is now desired to switch to force transducer 161a in lieu of the lengthwise strain transducer. Prior to this point, the fed-back output signal produced by transducer control module 170b is following the scaled lengthwise strain transducer feedback signal but biased by a constant. All the other fed-back output signals are zero-valued. To effectuate a switchover between the length-wise strain and force transducer feedback signals, the value of the command signal is first reduced by process computer 130 to zero. Once this occurs, all the fed-back output signals, including that produced by transducer control module 170b, are zero-valued. Thereafter, the process computer effectuates a switchover by setting the select signal, applied to lead 135a, to an appropriate value to place force transducer 161a as the feedback element in closed loop control, and simultaneously setting the select signal applied to lead 135b, to an appropriate value to de-select lengthwise strain transducer 161b as the feedback element. Specifically, process computer 130 sets the value of the select signal appearing on lead 135a to cause tracking A/D converter 174, within transducer control module 170a, to change from the "track" to the "hold" mode. The process computer also sets the value of the select signal appearing on lead 135b to cause the tracking A/D converter (not shown), within transducer control module 170b, to change from the "hold" to the "track" mode. In addition, the changed select signals, applied to switch 182, cause the fed-back output signal from transducer control module 170a to be routed through switching device 182a and in turn, via lead 181a, to a corresponding input of summer 110 and a ground potential—in lieu of the fed-back output signal produced by transducer control module 170b—to be applied to another input, via lead 181b, to summer 110.

At the point of switchover, i.e. when the select signal on lead 135a is set, force transducer 161a is probably producing a non-zero valued feedback signal. However, as previously discussed, by virtue of tracking A/D converter 174 being placed in the "hold" mode, the subtractive combination produced by summer 179, of the signal produced by D/A converter 171 and the scaled force transducer feedback signal results in (ignoring offsets) a zero-valued fed-back output signal produced by transducer control module 170a. This zero value which is produced by all the transducer control modules at the instant any switchover occurs—is used as a reference or "home" point by process computer 130. Therefore, once the appropriate select signals have been set, process computer 130 is only required to incrementally increase the command signal, with respect to zero, to a desired value corresponding to any greater or lesser amount of force than that occurring at switchover. The use of a zero-valued reference point for all transducers at switchover eliminates any requirement for the process computer to track any of the transducer feedback signals. Consequently, the process computer is not required to add or subtract any large feedback signals from the desired command signal. Thus, the command signal advantageously requires a narrow signal range equal only to the full scale range of each scaled feedback signal, typically ±10 volts. This, in conjunction with requiring the process computer to only perform the simple steps of reducing the command signal to zero, changing the value of appropriate select signals and incrementally increasing the command signal, advantageously simplifies the software needed to effectuate any switchover. Moreover, the above-described circuit advantageously maintains closed loop control at all times.

In practice, it has been found that while the circuit thus far described produces substantially "bumpless" switching between any pair of transducers, some slight transients may indeed occur in the error signal at switchover owing to differences in the electrical characteristics of the analog components comprising the transducer control modules involved in the switchover. These transients and the resulting bumps in the motion produced by the actuator can be advantageously removed by digitally enabled low pass filter 120. As shown in FIG. 1, this filter is a simple R-C network comprised of resistor 124 and capacitor 126 with digitally controlled analog switch 122 connected across the resistor. The component values are determined in practice by the desired reponse time of the filter. The switch is enabled by a suitable level produced by process computer 130 and applied to lead 134. At all times other than at a switchover, process computer 130 applies an appropriate level to lead 134 so as to enable switch 122. This effectively short-circuits the resistor and allows the error signal produced by summer 110 to be fed directly into the input of servo-amplifier 117. To eliminate any residual "bumps" from occurring during a switchover, process computer 130, immediately prior to reducing the command signal to zero, changes the level appearing on lead 134 so as to open switch 122. Thus, a low-pass R-C filter is effectively inserted in series between the output of summer 110 and the input to servo-amplifier 117. Consequently, the error signal is smoothed and thus any slight disturbance from zero (transient) occurring in the error signal, while the computer sets the appropriate select signals, is advantageously removed by the filter. Once the appropriate transducer has been selected, the process computer shortly thereafter closes switch 122 by applying the appropriate level to lead 134. Experimentally, it has been found that switch 122 can be opened as little as 5 microseconds prior to changing the select signals. Furthermore, for a hydraulic servo-mechanism of the type described above, a switchover between transducers can be accomplished in as little as 10 microseconds with the filter advantageously enabled for approximately 200-600 microseconds. Since the filter is enabled for a period of time that is short compared to the response time of a typical hydraulic servo-mechanism, the overall response of the servo-mechanism is advantageously unaffected by the filter.

Each transducer control module is capable of producing a feedback signal which is proportional to the stress produced in the mid-span of the specimen. To produce such a signal, the scaled feedback signals from the force and cross-wise strain transducers 161a and 161b, respectively, are applied together as inputs to stress computation circuit 178 contained within, illustratively, transducer control module 170e. The stress computation circuit—which is discussed in more detail in conjunction with FIG. 2—first computes the appropriate cross-sectional area, which for round specimens, is equal to the square of the value of the scaled cross-wise strain transducer feedback signal (the value of this signal is substantially equal to the diameter of the specimen) multiplied by an appropriate constant. The result is then divided into the value of the scaled force transducer feedback signal to yield a scaled stress feedback signal. The resultant scaled stress feedback signal is then applied via switch 173 to the input of tracking A/D converter 174 in transducer control module 170e which, in turn, provides an appropriate fed-back output signal to a corresponding input of summer 110 via respective switching device 182e and lead 181e.

Figure 2:
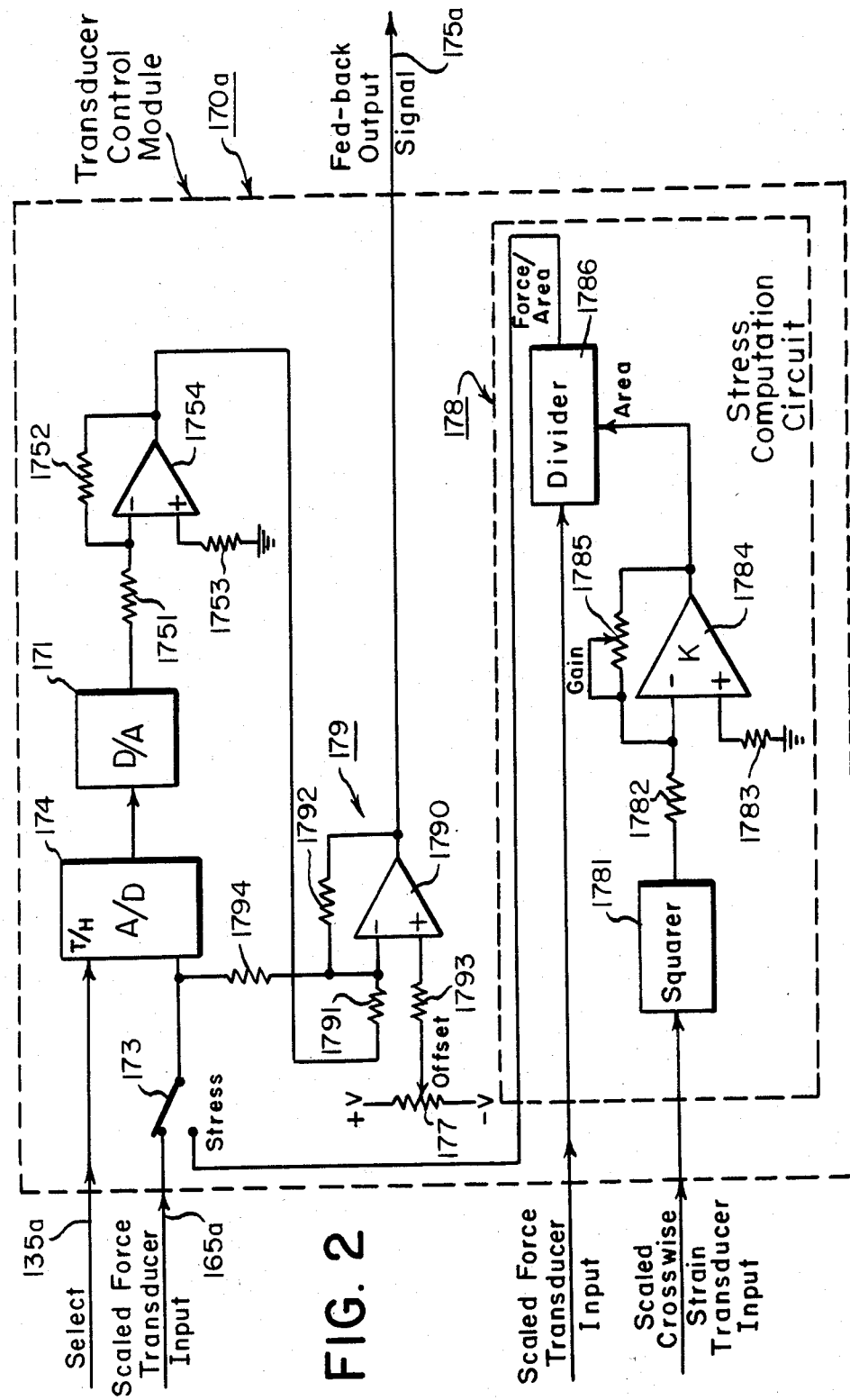
FIG. 2 is a block diagram of transducer control module 170a shown in FIG. 1.

The circuitry comprising each transducer control module, illustratively 170a, is shown in FIG. 2. The scaled force transducer feedback signal is applied, as previously discussed, to one input of switch 173. The other input is supplied with the output signal produced by stress computation circuit 178. The output of switch 173 is applied through tracking A/D converter 174 and D/A converter 171. Any tracking A/D converter with adequate resolution and sufficiently fast response time may be used. The select signal applied over lead 135a is a conventional TTL logic level. D/A converter 171 can be any conventional D/A converter which operates on the form of data, e.g. offset binary, produced by A/D converter 174. The output of D/A converter 171 is inverted by the circuit comprised of operational amplifier 1754 and equal valued resistors 1751, 1752 and 1753. This circuit may be eliminated if the polarity of the reference voltage (not shown) applied to D/A converter 171 is chosen appropriately. The inverted D/A output, the scaled feedback signal and the output of the offset potentiometer 177 are then all applied as respective inputs to subtractive summer 179. This summer is comprised of operational amplifier 1790 and equal valued resistors 1791, 1792, 1793 and 1794. Hence, the fed-back output signal equals the difference between the sum of the inverted output signals of the D/A converter, the scaled force (or stress) feedback signal and the offset produced by offset potentiometer 177.

Stress computation circuit 178 is comprised of squarer 1781, variable gain amplifier 1784 and divider 1786. The scaled cross-wire strain feedback signal is applied to the input of squarer 1781 which, in turn, provides an output signal which is equal to the negative square of the input signal, scaled by a constant, usually 10. This output signal is fed to variable gain amplifier 1784 which inverts the signal and multiplies it by a gain constant, K. The value of resistors 1783 and 1782 are equal, with the gain constant, K, determined by the resistanc of gain potentiometer 1785 divided by that of resistor 1782. The gain constant, K, is determined, in part by scaling considerations and in part by the geometry of the specimen, such that the voltage produced by variable gain amplifier 1784 is substantially equivalent to the cross-sectional area of the specimen. Lastly, the scaled stress feedback signal is obtained by dividing, using divider 1786, the scaled force feedback signal by the voltage produced by variable gain amplifier 1784.

In view of the foregoing discussion, it is readily apparent to those skilled in the art that applicant's apparatus can be easily and readily extended to accommodate any number of different feedback transducers. All that is required to add another transducer to the circuitry of the servo-controller is the addition of another transducer control module—substantially equivalent to transducer control module 170a—and another switching device contained within switch 182. Advantageously, the process computer is only required to have the capability of providing an additional select signal. In the event no additional outputs are available on the process computer to accommodate another select signal, any one of a number of well known simple multiplexing techniques may be used in order to permit the process computer, with a limited number of outputs, to provide a greater number of select signals.

In addition, digitally enabled low pass filter 120 is not limited to a single stage R-C filter, but can in fact be a multi-stage R-C filter or even any type of low-pass filter that can be digitally enabled and disabled. Such filters include, but are not limited to, a variety of different active filter configurations.

Although a particular embodiment has been shown and described herein, many varied embodiments of the present invention may be devised by those skilled in the art without departing from the spirit and scope of the invention.

I claim:

1. In a servo-mechanism, which is capable of bumplessly switching between at least two feedback transducers, said servo-mechanism being of a type comprised of a summer which produces an error signal which is substantially equal to the difference between a command signal and any one of at least two fed-back output signals, at least two transducers each of which produces a corresponding feedback signal, and at least two circuits each operative in response to a corresponding one of said feedback signals for providing a corresponding one of said fed-back output signals, each of said circuits comprising:
   means operative in response to said corresponding feedback signal and to a corresponding one of a plurality of select signals for producing a tracking signal which has a value that either tracks the value of said corresponding feedback signal or remains constant, and
   means for subtractively combining said tracking signal with said corresponding feedback signal to produce said corresponding fed-back output signal, and
   said servo-mechanism being further comprised of means for generating said plurality of select signals in accordance with the particular transducers being switched.

2. The servo-mechanism of claim 1 wherein the tracking signal producing means is comprised of a track and hold amplifier operative in response to said corresponding feedback signal and said select signal, and is further operative in either a track mode or a hold mode, wherein the mode of operation is determined by the value of said corresponding select signal.

3. The servo-mechanism of claim 2 wherein said track and hold amplifier is comprised of an analog to digital converter operative in response to the value of said corresponding select signal to cause the digital output of said converter to either track said predetermined feedback signal or remain constant, and a digital to analog converter operative in response to said digital output.

4. The servo-mechanism of claim 3 wherein said servo-mechanism is further comprised of means for smoothing said error signal in order to remove any transients appearing therein.

5. The servo-mechanism of claim 4 wherein said smoothing means is a switchable filter.

6. The servo-mechanism of claim 5 wherein said servo-mechanism further includes a plurality of switching devices, each of which is operative in response to an associated one of said select signals for applying a corresponding one of said fed-back output signals to a corresponding input of said summer.

7. The servo-mechanism of claim 6 wherein each of said switching devices includes means operative in response to said associated select signal for alternatively applying a ground potential to a corresponding input of said summer in lieu of said corresponding fed-back output signal.

8. The servo-mechanism of claim 7 wherein said switchable filter is a digitally enabled low-pass filter.

* * * * *